United States Patent
Strahl et al.

(10) Patent No.: US 7,440,979 B2
(45) Date of Patent: Oct. 21, 2008

(54) SNAPSHOTS FOR INSTANT BACKUP IN A DATABASE MANAGEMENT SYSTEM

(75) Inventors: Torsten Strahl, Berlin (DE); Henrik Hempelmann, Havelberg (DE); Uwe H. O. Hahn, Berlin (DE)

(73) Assignee: SAP AG, Walldorf (DE)

( * ) Notice: Subject to any disclaimer, the term of this patent is extended or adjusted under 35 U.S.C. 154(b) by 500 days.

(21) Appl. No.: 11/093,686

(22) Filed: Mar. 30, 2005

(65) Prior Publication Data

US 2006/0230079 A1 Oct. 12, 2006

(51) Int. Cl.
*G06F 17/30* (2006.01)

(52) U.S. Cl. ............... 707/203; 707/202; 707/204; 707/205; 707/206

(58) Field of Classification Search .......... 707/202–206
See application file for complete search history.

(56) References Cited

U.S. PATENT DOCUMENTS

| | | | | |
|---|---|---|---|---|
| 5,369,757 A * | 11/1994 | Spiro et al. | ...... | 714/19 |
| 5,649,152 A * | 7/1997 | Ohran et al. | ...... | 711/114 |
| 5,835,953 A * | 11/1998 | Ohran | ...... | 711/162 |
| 6,073,222 A * | 6/2000 | Ohran | ...... | 711/162 |
| 6,105,030 A * | 8/2000 | Syed et al. | ...... | 707/10 |
| 6,240,527 B1 * | 5/2001 | Schneider et al. | ...... | 714/21 |
| 6,665,815 B1 * | 12/2003 | Goldstein et al. | ...... | 714/20 |
| 6,745,344 B1 * | 6/2004 | Joshi et al. | ...... | 714/38 |
| 7,133,884 B1 * | 11/2006 | Murley et al. | ...... | 707/202 |
| 7,162,498 B2 * | 1/2007 | Nomoto et al. | ...... | 707/202 |
| 7,181,476 B2 * | 2/2007 | Lee et al. | ...... | 707/203 |
| 7,225,208 B2 * | 5/2007 | Midgley et al. | ...... | 707/204 |
| 2004/0139128 A1 * | 7/2004 | Becker et al. | ...... | 707/204 |
| 2004/0267828 A1 * | 12/2004 | Zwilling et al. | ...... | 707/200 |
| 2004/0267835 A1 * | 12/2004 | Zwilling et al. | ...... | 707/202 |
| 2004/0268068 A1 * | 12/2004 | Curran et al. | ...... | 711/162 |
| 2006/0112151 A1 * | 5/2006 | Manley et al. | ...... | 707/201 |
| 2007/0022146 A1 * | 1/2007 | Murley et al. | ...... | 707/204 |

* cited by examiner

*Primary Examiner*—Yicun Wu
*Assistant Examiner*—Joshua Bullock
(74) *Attorney, Agent, or Firm*—Buckley, Maschoff & Talwalkar LLC

(57) ABSTRACT

A system, method, apparatus, means and computer program code for processing a request to create a snapshot version of a database are provided which include identifying a current state of a converter table, the converter table including information identifying a plurality of page identifiers and a physical location of each of the page identifiers in a data area, saving the current state of the converter table, and marking each of the plurality of page identifiers to prevent overwriting.

17 Claims, 4 Drawing Sheets

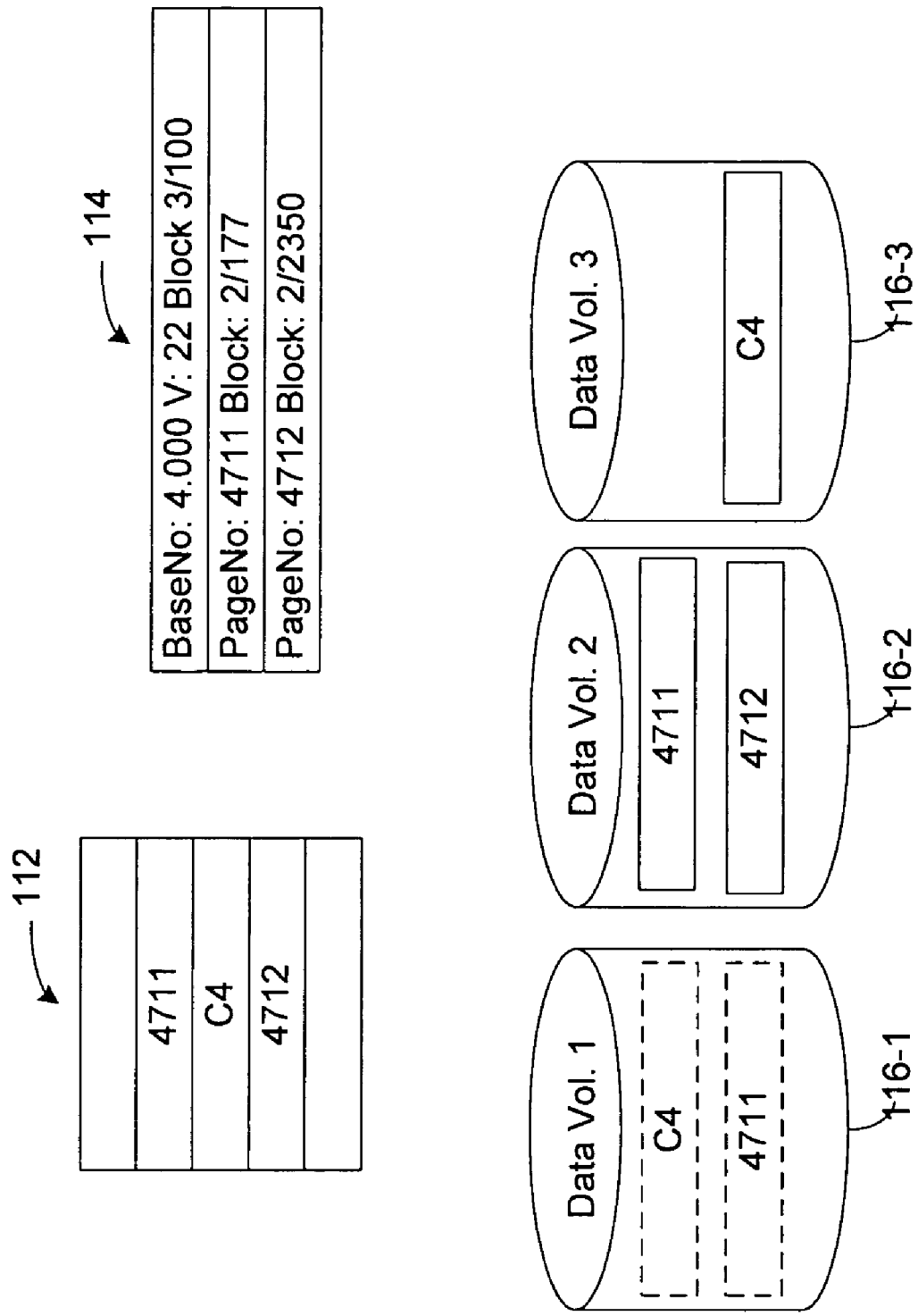

SNAPSHOTS FOR INSTANT BACKUP IN A DATABASE MANAGEMENT SYSTEM

FIELD

Embodiments of the present invention relate to database systems. More specifically, some embodiments relate to systems and methods for managing data in a database system.

BACKGROUND

Many database systems allow administrators or other authorized users to restore the database in the event of a database crash or other error. For example, in the event of a crash, the last known good version of the database may be retrieved and brought up to date to the time of the crash using data from a data log.

Database systems may also allow administrators or other authorized users to reset the database to an older state. Generally, such resets require that data be retrieved from an external backup of the database. For example, if the data volumes storing the database are backed up daily, an administrator may be able to reset the database to the previous day's state by retrieving the backup data from the previous day. Such backup techniques are desirable for many purposes, and ensure that data is recoverable in the event of catastrophic system errors.

However, in some situations, an administrator or other user may wish to more frequently restart a database in an earlier known state. In such situations, the use of existing techniques would decrease the availability of the database system and require valuable time, hardware and other resources. It would be desirable to provide improved systems and methods for restarting databases in an known earlier state.

SUMMARY

Pursuant to some embodiments, a system, method, apparatus, means and computer program code for processing a request to create a snapshot version of a database are provided which include identifying a current state of a converter table, the converter table including information identifying a plurality of page identifiers and a physical location of each of the page identifiers in a data area, saving the current state of the converter table, and marking each of the plurality of page identifiers to prevent overwriting. Pursuant to some embodiments, saving the current state of the converter table includes copying a current restart record to a snapshot restart record.

Pursuant to some embodiments, the snapshot version is restored upon receiving a request to restore the database to the snapshot version, and copying the snapshot restart record onto a current restart record of the database.

Pursuant to some embodiments, a system, method, apparatus, means and computer program code for setting up a training database are provided which include selecting a database as the training database, the training database having an initial state, creating a snapshot version of the initial state of the training database by saving a copy of a current restart record as a snapshot restart record, making the training database available for use by participants in a training class, and restoring the training database to the initial state by copying the snapshot restart record to a current restart record.

With these and other advantages and features that will become hereafter apparent, a more complete understanding of the nature of the invention can be obtained by referring to the following detailed description and to the drawings appended hereto.

BRIEF DESCRIPTION OF THE DRAWINGS

FIG. 4 is an illustration of the data cache, converter and data volumes at a second point in time according to some embodiments.

DETAILED DESCRIPTION

To alleviate problems inherent in the art, embodiments of the present invention introduce systems, methods, computer program code and means for restarting a database to an earlier state. Pursuant to some embodiments, a database may be easily and efficiently restarted at an earlier state without requiring reference to backup volumes or the performance of an initialization process.

To illustrate features of some embodiments, an example environment will be described. The example is for illustration only, and is not intended to limit the scope of the present invention (e.g., those skilled in the art will appreciate that embodiments may be used in other environments as well). In the example, a database system is used in a hands-on training class to train new database administrators how to use, maintain and interact with the database system. Each training class starts with the data in the database system in a known state. As each training class progresses, trainees are allowed to enter, manipulate, and otherwise modify data in the database to follow a training curriculum.

At the end of the class, the data in the database may be significantly different than at the start of the class. In the illustrative example, once a training class is over, a subsequent class may need use of the same database system. The subsequent class needs the database system to be reset to the initial or known state so that the curriculum can be followed from a known set of data. Embodiments allow such a database system to be easily and efficiently reset or restarted to the known state. As will be described further below, pursuant to the present invention, a "snapshot" of the database is created at the start of the training course. At the end of each class, an administrator may reset the database to the snapshot version with a simple database command. Further details and features of some embodiments will be provided below.

For the purposes of illustration, but not limitation, a particular type of database system will be used to describe certain features of embodiments. More particularly, a relational database management system will be described, although those skilled in the art will recognize that the techniques and embodiments described herein may be implemented with desirable results in other types of database systems.

Figure 1:
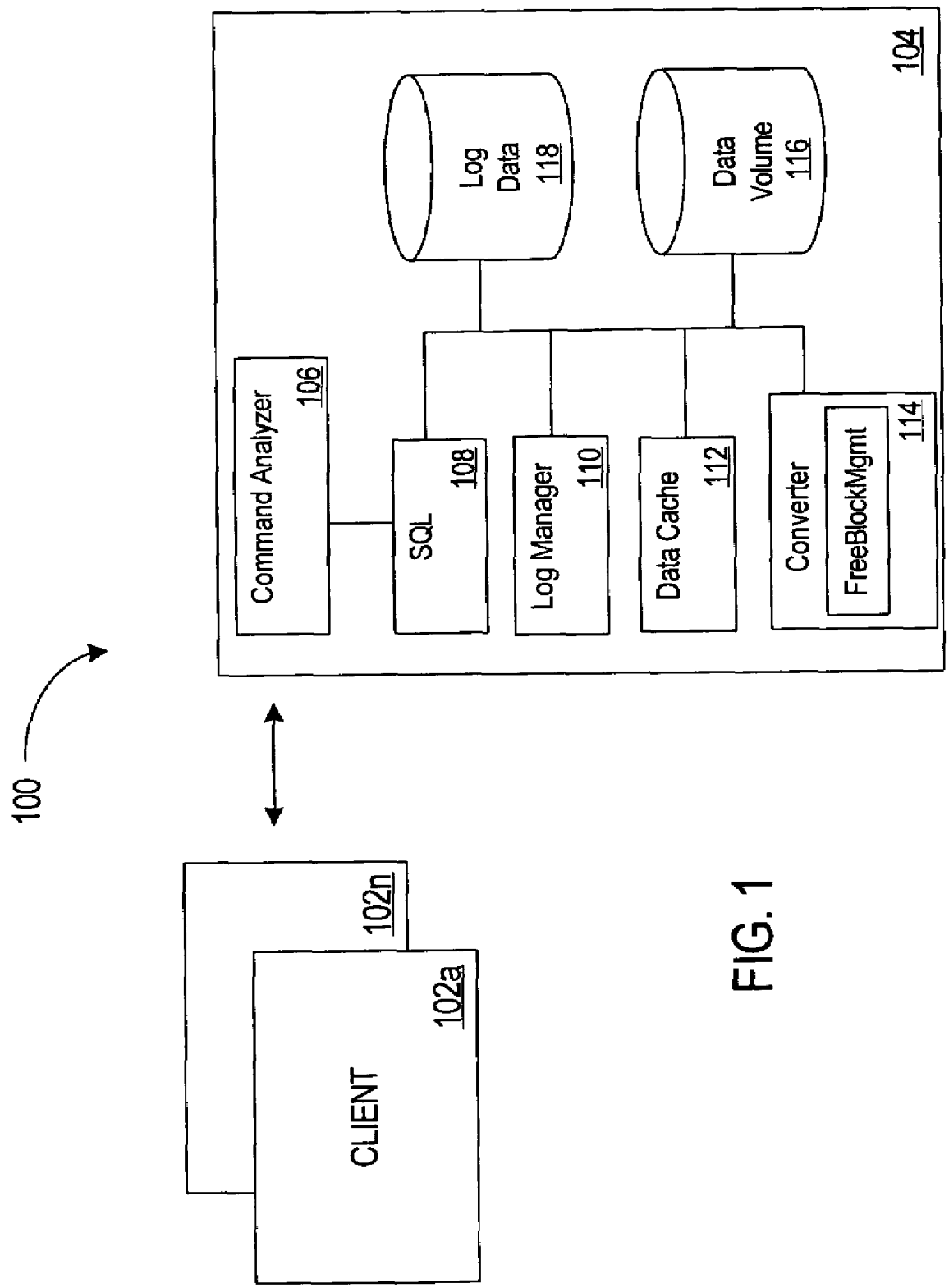
FIG. 1 is a diagram of a system according to some embodiments.

To illustrate features of some embodiments of the present invention, reference is first made to FIG. 1 where an illustrative database system 100 is shown. For simplicity, only several components of database system 100 are shown in FIG. 1; those skilled in the art will appreciate that a database system typically may include a number of other components including, for example, I/O devices, drivers, APIs, and the like. Database system 100 may be, for example, a structured query language ("SQL") database system. For the purpose of illustration, but not limitation, database server 104 may be the MaxDB® system offered by mySQL AB and SAP AG of Walldorf Germany. Database system 100 includes one or more client devices 102 interacting with a database server 104. For example, each client device 102 includes software configured to allow one or more users or applications to interact with database server 104 to submit queries and receive database responses. As a simple example, client 102 may be a computing device (such as a personal computer) operating Internet browser software (such as Microsoft's Internet Explorer®) to interact with database server 104 over a network connection by submitting SQL queries to database server 104 and by receiving responses from the database server 104. As an example (continuing the training environment example introduced above), one or more client devices 102 may be operated by trainees during a training class.

While the system 100 of FIG. 1 only shows two client devices 102 and a single database server 104, those skilled in the art will recognize that database system 100 may include any number of clients interacting with one or more database servers. Further, for the purpose of illustration but not limitation, some or all of the client devices 102 and database server 104 may be implemented on computing devices such as, for example, computing devices implemented with Intel® x86 processors running a version of Microsoft Windows® or LINUX.

Database server 104 may consist of a number of elements (some of which are shown) interacting to create databases, store data, and respond to queries, including, for example, a command analyzer 106, a SQL component 108, a log. manager 110, a data cache 112, a converter 114, a data volume 116 and a data log 118. In general, database server 104 receives a database request from client 102 and responds to the request. Command analyzer 106 operates to analyze requests to identify the specific database interactions to be taken and passes SQL commands to SQL system 108 for application to data stored in data volume 116. Data volume 116 may consist of one or more devices or components (e.g., such as an array of mass storage devices).

Frequently, SQL commands received by database server 104 will require modification of data stored in (or to be added to) a database. When information from the database is to be modified, the data is retrieved from data volume 116 and manipulated in data cache 112. To increase the speed of manipulation of data, data cache 112 may be implemented using volatile memory such as random access memory (RAM) of the server. Once the data manipulation is complete (or after a series of manipulations has completed), the modified data is written from (or "committed") data cache 112 to data volume 116 to update the database. Further, a log entry may be written in data log 118 (e.g., to allow the database to be restored to a consistent state if an error occurs).

For convenience, clarity and ease of exposition, a number of terms are used herein. For example, the term "server" is used to refer to software configured to perform tasks in response to requests from a "client". One or more servers may be implemented on a given computing device. In the context of the illustrative example where the database system is a relational database system, several terms will be used to describe features of some embodiments. A relational database management system organizes data in two-dimensional "tables", each having one or more "rows" and "columns". Each row is assigned a "primary key" (or some other internally assigned system key, both of which will be generally referred to herein as a "primary key" or simply, a "key").

A number of rows, ordered in key sequence, are stored in fixed size "pages" (for example, in the MaxDB system, pages are each 8 kbytes in size) in data volume 116. A number of pages from the same table are referred to as a "file". In the example system, each of the pages of a file are organized in a b*tree, with the data pages in leaf level "0" and ordered by key sequence (those skilled in the art will appreciate that other organization techniques may be used).

When a new page is created, the page is assigned a unique identifier or "page identifier" or "page ID". All page accesses are addressed using this page ID. Pages are written to "blocks" of the same size on the attached data volumes. The "data area" is equal to the sum or entirety of all area designated for the database system in the attached data volumes 116. The data volumes 116 may be, for example, any of a number of different types of mass storage devices, including for example, magnetic media or the like.

Pursuant to some embodiments, when data (on a page) is modified, the page(s) to be modified are read into the data cache 112 and the data is updated. A log entry may be written to the log data 118 (to allow recovery in the event of an error). When a number of modified pages in data cache 112 exceeds a predefined threshold (or after a predetermined time period passes), all of the modified pages are written back to the data volumes 116.

Pursuant to some embodiments, the modified data pages are not rewritten to their original locations; instead, modified data pages are written to new free blocks on in the data volumes 116. This results in two instances of the data page on the volume: the "last known good" page and the updated page. In case of a recovery of a crashed database, the updated pages are ignored, and the "last known good" pages are used instead. Database content is then reconstructed by redoing all of the log entries. As mentioned above, periodically (e.g., every few minutes), a synchronization of log data 118 and data volumes 116 are performed. All modified data pages are flushed to the data volumes 116 and marked as the "last known good" version. This point in time is marked as a "savepoint", and is written to log data 118. Each savepoint has an unique identifier called savepoint version or converter version or still version. This version is stored in the restart record which will be flushed at the end of each savepoint. The blocks on the data volumes 116 which contained the previous (and now superceded) "last known good" pages are marked as free and ready for a reassignment.

Converter 114 is used to store the current mapping between the page IDs and the block addresses of the individual data volumes 116. Pursuant to some embodiments, to ensure ready recovery in the event of an error, converter 114 maps the addresses of both the "last known good" page data and the updated page. In some embodiments, converter 114 will be flushed to the data volumes at the end of a savepoint particularly after all modified data pages are written and before the restart record is flushed. The restart record contains a reference to the starting point of the current converter 114. Converter 114 may also store information identifying the blocks that are now free and ready for a reassignment.

In some embodiments, a subcomponent of converter 114 (referred to in FIG. 1 as the "FreeBlockMgmt" subcomponent), is used to identify free and used blocks as well as to assemble adjacent blocks into clusters as described further below. For simplicity, the FreeBlockMgmt subcomponent will be referred to simply as the "converter" below. Those skilled in the art will appreciate that other subcomponents or modules may be used to implement certain functions as described herein.

Figure 2:
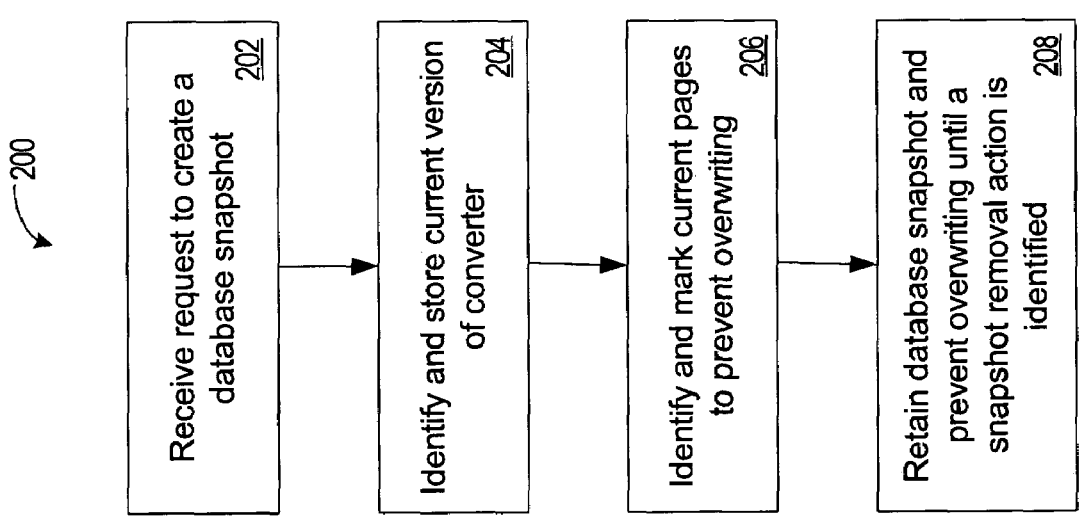
FIG. 2 is a flow diagram of a method according to some embodiments.

Reference is now made to FIG. 2, where a process 200 is shown for writing data to data volumes 116. The process depicted in FIG. 2 (and other processes described herein) does not imply a fixed order to the process steps, and embodiments of the present invention may be performed in any order that is practicable. Process 200 may be performed using code implemented on database server 104.

Process 200 begins at 202 with the receipt of a request to create a database snapshot. For example, the request may be received from an administrator or other authorized user operating user device 102. The request may be presented as a SQL command while the authorized user has placed the database system in an administrative operational state.

After database server 104 receives the request at 202, processing continues at 204 where server 104 identifies, reads and stores the current version of converter 114. More particularly, in some embodiments, server 104 creates a copy of a restart record (also called a "snapshot restart record") which contains the starting point of converter 114. Snapshot restart record is written in a data volume 116 and the address is stored in the original restart record. In some embodiments, a timestamp may also be created, indicating the time when the snapshot was defined.

Processing continues at 206 where server 104 operates to identify and mark each of the physical data pages (in data volumes 116) that are addressed by the converter version identified at 204. More particularly, in some embodiments, each of the data pages that represent the state of the database system at the time the snapshot request is received are identified and associated with the snapshot (e.g., by reading and rebuilding the table information for management of block records also known as "FreeBlockManagement" in the MaxDB system). Further, each of the data pages are marked, tagged, or otherwise identified as being part of a snapshot so that the pages will not be overwritten until a snapshot removal command is received.

Put another way, the database system writes changes that are made after the creation of the snapshot to other physical pages in the data volumes 116. If a table associated with the snapshot version is deleted, the system does not physically delete the table. Instead, the table is only marked as deleted (e.g., the table can no longer be accessed by SQL statements). An example of this marking and identification will be provided below in conjunction with the description of FIG. 3 and FIG. 4.

Upon completion of the processing associated with 204 and 206, a snapshot is created. Processing continues at 208 where the snapshot is retained and preserved until a snapshot removal command of some sort is identified. That is, the data associated with the snapshot (including the converter information and the page information), are preserved and prevented from being overwritten, despite any database changes occurring after creation of the snapshot.

Pursuant to some embodiments, several different snapshot removal commands may be received, including a command to restore the database to the snapshot. For example, in some embodiments, an administrator or other authorized user may place the database instance in an administrative state and enter a SQL command to revert to the snapshot state. In this situation, the database system copies the "frozen" snapshot restart record onto the restart record and therefore the starting point of the latest converter is replaced by the converter of the snapshot. The log is cleared, and all pages that changed after the creation of the snapshot are released for overwriting. Effectively, the database system is placed back in the state it was in at the time of the snapshot. Pursuant to some embodiments, after a snapshot is restored, it remains valid until deleted, dropped or replaced.

Other snapshot removal commands may include, for example: (i) a request by an administrator or other authorized user to create a new database instance (in which case the snapshot will be rendered irrelevant and deleted), (ii) a request by an administrator or other authorized user to drop or delete the snapshot (e.g., where the user determines that it is no longer desirable or necessary to revert to the snapshot), or (iii) a request by an administrator or other authorized user to create a new snapshot (e.g., to supercede the first snapshot and replace it with a new snapshot). Those skilled in the art will appreciate that other situations may exist in which snapshots may be removed or deleted. Upon removal of a snapshot, the pages marked or preserved in conjunction with the snapshot are released in the data volumes 116 for overwriting.

Returning to the training course illustrative example introduced above, process 200 may be described as follows (from the perspective of an administrator operating user device 102). A database administrator may interact with database server 104 via user device 102 to set the database server 104 up for a training session by setting the database to a known configuration (e.g., by importing or opening a known training database). The database administrator may place the database system in an administrative state and submit a snapshot SQL command to the system. The database system may confirm that the snapshot has been created by returning a confirmation message to the administrator.

The administrator may then place the database in an online operational state. Students may then be given access to the database system to conduct the training session. The students may make any changes to the data and also be allowed to start and stop the database instance. At the end of the training session, and before the start of the next training session, the database administrator may place the system in an administrative state and submit a SQL request to revert to the snapshot. The database system may confirm that it has successfully reverted to the snapshot, and the administrator may then place the system back into an operational state for the next class. In this manner, each training class is able to start the session from a known configuration of data and is also free to modify, update and otherwise interact with the system. Previous systems and solutions required administrators to restart the database system using backup data—a solution that is resource intensive and time consuming.

Figure 3:
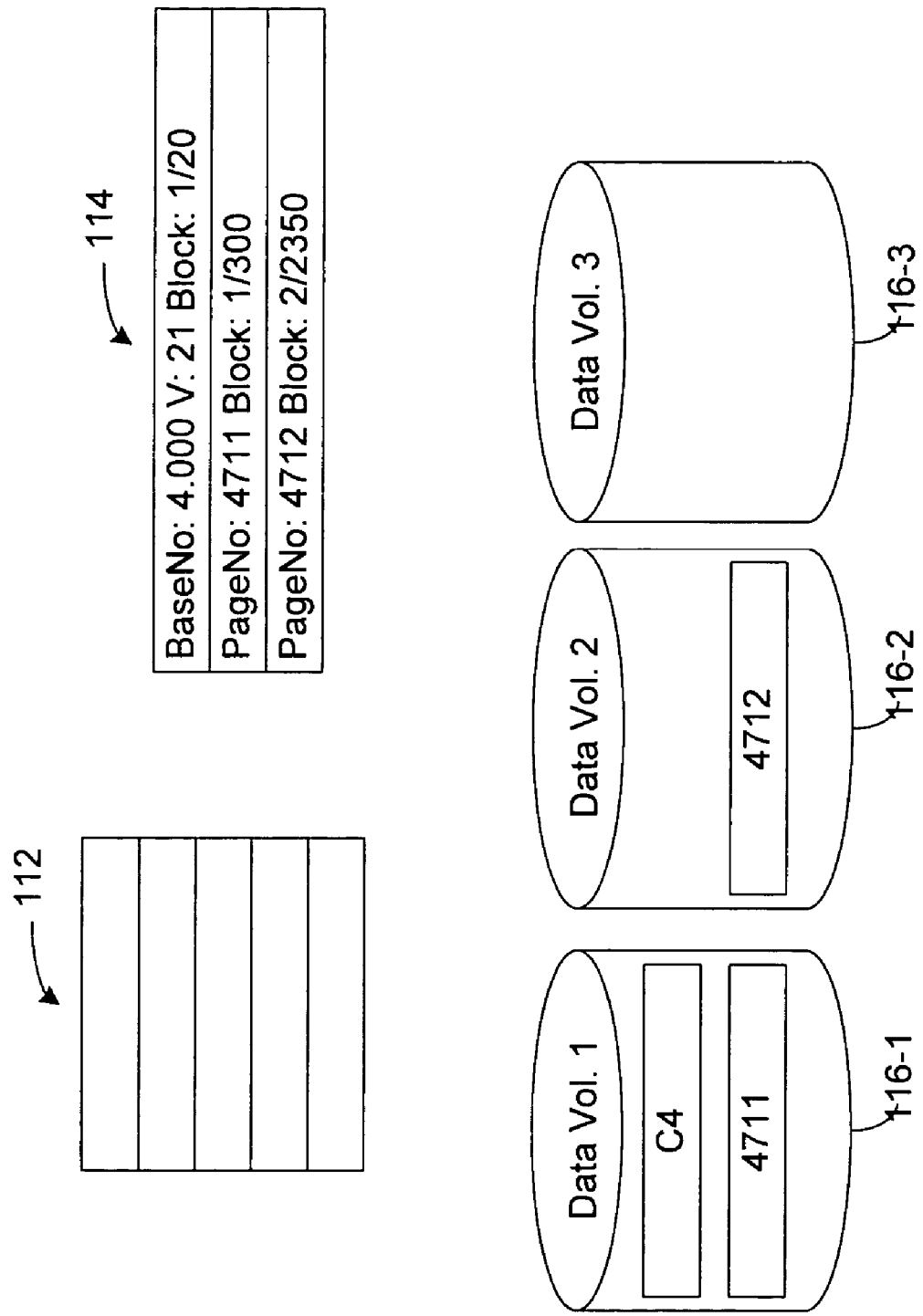
FIG. 3 is an illustration of a data cache, converter, and data volumes at a first point in time according to some embodiments.

Reference is now made to FIG. 3, where selected components of database system 100 are shown and will be used to describe the storage of data and the creation of a "snapshot" pursuant to some embodiments. More particularly, FIG. 3 depicts data cache 112, converter 114 and data volumes 116 at a particular point in time where data cache 112 has been flushed. For example, the point in time depicted is immediately after data pages modified and stored in the cache have been written to data volumes 116 and a "savepoint" has been created. As shown, the savepoint is savepoint "V.21", and converter 114 stores a page of converter information referred to as converter page "C4".

Converter page "C4" is stored in the first volume of the three data volumes at block 20. At the time of creation of savepoint "V.21", converter 114 stored information identifying two pages: page 4711 (stored in volume 1 at block 300) and page 4712 (stored in volume 2 at block 2350). Pursuant to some embodiments, if a user (e.g., such as an administrator or other authorized user) elected to create a "snapshot" at this point in time, the database system would save a reference to the current starting point in converter 114 in the restart page of the database instance.

Further, each of the pages that are addressed by converter 114 would be marked or flagged to indicate that the pages are part of a snapshot and cannot be overwritten (even if the data in the pages becomes outdated). That is, if an administrator creates a snapshot at the point in time represented in FIG. 3, the following blocks would be saved: 1/20 (including the converter image "C4"), 1/300 (including page number 4711), and 2/2350 (including page number 4712). The database system would ensure that none of these blocks are overwritten or used until an authorized removal command is received (e.g., such as a command to delete the snapshot, a command to revert to the snapshot, a command to create a new database instance, or a command to create a new snapshot).

Reference is now made to FIG. 4, where the same selected components of database system 100 are shown as were shown in FIG. 3, but at a slightly later point in time. More particularly, FIG. 4 depicts data cache 112, converter 114 and data volumes 116 after pages have been updated by the database system and data cache 112 is in the process of a further flush operation (to store the updated page information in data volumes). As shown, page 4711 has been updated and is shown as being written from cache 112 to data volume 2 (at block 177). Because this update affects converter image "C4", the converter image is also updated and written to data volumes 116 (in particular, the updated image is stored in data volume 3 at block 100). Pursuant to some embodiments, because a snapshot was created at the point in time shown in FIG. 3, the previous versions of pages 4711 and 4712 (as well as the previous converter image C4) are all saved and prevented from being overwritten. That is, the information saved at 1/20 ("C4") and 1/300 (old page 4711) are saved and prevented from being overwritten. The other page associated with the snapshot (page number 4712) has not been modified in this example, and, accordingly, the information stored at 2/2350 is still relevant.

In this manner, a new version of the converter is gradually created. Over time (from the creation of the snapshot), the new converter differs increasingly from the version of the converter that was saved for the snapshot. Any pages that change after the snapshot are released for overwriting as normal. The pages and converter information stored for the snapshot are retained and prevented from overwriting until an authorized snapshot removal command is received (e.g., as discussed above, this may include either the creation of a new database instance, restoring to the snapshot, dropping the snapshot, or creating a new snapshot).

Pursuant to some embodiments, when pages are written to the data area, the version information of the page and the snapshot version stored in the converter can be used to determine whether a particular page is relevant to the snapshot (and, if so, whether a page should not be overwritten). Note that the version information of a page is part of the page header and will be updated with each write operation. For example, if the page version is less than or equal to the snapshot version, the page is relevant for the snapshot and must not be overwritten. Otherwise, the page could be overwritten without impacting the snapshot. In this manner, embodiments allow an authorized user to quickly and efficiently revert to a known state of the database, without needing to retrieve backup data or the like. Although the present invention has been described above with respect to some embodiments thereof, it should be noted that the above-described embodiments may be altered to create completely or partially different embodiments without departing from the spirit and scope of the appended claims.

What is claimed is:

1. A method of providing a snapshot version of a database, the method comprising:
    receiving a request to create a snapshot version of a database;
    identifying, in response to receiving said request, a current state of a converter table, said converter table including information for mapping a plurality of page identifiers to a physical location of each of said page identifiers in a data area;
    saving said current state of said converter table;
    marking each of said plurality of page identifiers to prevent overwriting;
    updating a page of information that corresponds to one of the marked page identifiers by storing the undated page of information at a new physical location that does not correspond to the one of the marked page identifiers;
    updating the converter table to indicate the new physical location; and
    allowing overwriting of the new physical location.

2. The method of claim 1, wherein said saving said current state of said converter table includes copying a current restart record to a snapshot restart record.

3. The method of claim 2, further comprising:
    receiving a request to restore said database to said snapshot version; and
    copying said snapshot restart record onto a current restart record of said database.

4. The method of claim 1, further comprising:
    retaining said current state of said converter table until a snapshot removal action is received.

5. The method of claim 4, wherein said snapshot removal action is one of: a request to create a new instance of said database, a request to drop said snapshot version, and a request to create a new snapshot version.

6. The method of claim 4, wherein receipt of said snapshot removal action further causes removal of said marking of each of said plurality of page identifiers.

7. The method of claim 1, further comprising:
    receiving a request to restore said database to said snapshot version;
    restoring said database to said snapshot version; and
    retaining said snapshot version after restoring said database.

8. A database system, comprising:
    a memory storing processor-executable process steps; and
    at least a first processor in communication with the memory and operative in conjunction with the stored process steps to:
        receive a request to create a snapshot of a database;
        identify a current state of a converter table associated with said database, said converter table including information for mapping a plurality of page identifiers to a physical location of each of said page identifiers in a data area;
        save said current state of said converter table;
        mark each of said plurality of page identifiers to prevent overwriting;
        update a page of information that corresponds to one of the marked page identifiers by storing the undated page of information at a new physical location that does not correspond to the one of the marked page identifiers;
        update the converter table to indicate the new physical location; and
        allow overwriting of the new physical location.

9. The database system of claim 8, wherein said process steps to save said current state of said converter table include process steps to copy a current restart record to a snapshot restart record.

10. The database system of claim 9, further comprising stored process steps to:
    receive a request to restore said database to said snapshot version; and copy said snapshot restart record onto a current restart record of said database.

11. The database system of claim 8, further comprising stored process steps to:

retain said current state of said converter table until a snapshot removal action is received.

12. The database system of claim 11, wherein said snapshot removal action is one of: a request to create a new instance of said database, a request to drop said snapshot version, and a request to create a new snapshot version.

13. A medium storing processor-executable process steps, the process steps comprising:

receiving a request to create a snapshot of a database;

identifying a current state of a converter table, said converter table including information for mapping a plurality of page identifiers to a physical location of each of said page identifiers in a data area;

saving said current state of said converter table;

marking each of said plurality of page identifiers to prevent overwriting;

updating a page of information that corresponds to one of the marked page identifiers by storing the undated page of information at a new physical location that does not correspond to the one of the marked page identifiers;

updating the converter table to indicate the new physical location; and allowing overwriting of the new physical location.

14. The medium of claim 13, wherein said process steps to save said current state of said converter table include process steps to copy a current restart record to a snapshot restart record.

15. The medium of claim 14, the process steps further comprising:

receiving a request to restore said database to said snapshot version; and copying said snapshot restart record onto a current restart record of said database.

16. The medium of claim 13, the process steps further comprising:

retaining said current state of said converter table until a snapshot removal action is received.

17. The medium of claim 16, wherein said snapshot removal action is one of: a request to create a new instance of said database, a request to drop said snapshot version, and a request to create a new snapshot version.

* * * * *